(12) United States Patent
Emrick et al.

(10) Patent No.: US 7,563,507 B2
(45) Date of Patent: Jul. 21, 2009

(54) PYRIDINE AND RELATED LIGAND COMPOUNDS, FUNCTIONALIZED NANOPARTICULATE COMPOSITES AND METHODS OF PREPARATION

(75) Inventors: Todd S. Emrick, Deerfield, MA (US); Habib Skaff, Amherst, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 10/643,015

(22) Filed: Aug. 18, 2003

(65) Prior Publication Data

US 2004/0106781 A1     Jun. 3, 2004

Related U.S. Application Data

(60) Provisional application No. 60/404,105, filed on Aug. 16, 2002.

(51) Int. Cl.
   B32B 1/00      (2006.01)
   B32B 15/04     (2006.01)
   C09K 11/00     (2006.01)

(52) U.S. Cl. .................. 428/402; 252/301.4 R; 252/301.6 R; 252/301.6 S; 528/423; 528/425; 977/773; 977/774; 977/810; 977/813; 977/825; 977/827

(58) Field of Classification Search ............. 525/326.1, 525/374, 375, 379, 380, 328.8; 428/357, 428/402, 403, 407
See application file for complete search history.

(56) References Cited

U.S. PATENT DOCUMENTS

| | | | | |
|---|---|---|---|---|
| 5,578,325 | A * | 11/1996 | Domb et al. ................ | 424/501 |
| 5,849,860 | A * | 12/1998 | Hakimi et al. ............. | 528/370 |
| 6,235,540 | B1* | 5/2001 | Siiman et al. .............. | 436/518 |
| 6,306,610 | B1 | 10/2001 | Bawendi et al. | |
| 6,326,144 | B1 | 12/2001 | Bawendi et al. | |
| 6,380,405 | B1* | 4/2002 | Ekwuribe et al. .......... | 549/510 |
| 6,468,808 | B1 | 10/2002 | Nie et al. | |
| 6,649,138 | B2 | 11/2003 | Adams et al. | |
| 6,710,366 | B1* | 3/2004 | Lee et al. ................... | 257/14 |
| 6,794,265 | B2* | 9/2004 | Lee et al. ................... | 438/409 |
| 6,819,845 | B2* | 11/2004 | Lee et al. ................... | 385/122 |
| 6,961,499 | B2* | 11/2005 | Lee et al. ................... | 385/122 |
| 7,020,372 | B2* | 3/2006 | Lee et al. ................... | 385/129 |
| 7,358,525 | B2* | 4/2008 | Lee ............................ | 257/22 |
| 7,402,832 | B2* | 7/2008 | Lee ............................ | 257/17 |
| 2001/0023078 | A1 | 9/2001 | Bawendi et al. | |
| 2002/0192476 | A1* | 12/2002 | Kambe et al. ............. | 428/447 |
| 2003/0035887 | A1* | 2/2003 | Baglin et al. .............. | 427/180 |
| 2003/0066998 | A1* | 4/2003 | Lee ............................ | 257/19 |
| 2003/0077625 | A1 | 4/2003 | Hutchinson | |
| 2003/0124194 | A1* | 7/2003 | Gaw et al. .................. | 424/491 |
| 2004/0005243 | A1 | 1/2004 | Mulhern et al. | |
| 2004/0033345 | A1* | 2/2004 | Dubertret et al. .......... | 428/220 |
| 2004/0105973 | A1 | 6/2004 | Nabiev et al. | |

FOREIGN PATENT DOCUMENTS

| WO | WO 02/20200 | | 3/2002 |
|---|---|---|---|
| WO | WO 02/073155 | A1 | 9/2002 |
| WO | WO 02/074997 | A1 | 9/2002 |
| WO | WO 03/037788 | A1 | 5/2003 |

OTHER PUBLICATIONS

Skarzewski et al.; "New complexing surfactants, Synthesis of 4-alkoxypyridines and bipyridines"; Heterocycles, vol. 12, Issue 11, pp. 1403-1406; 1979.*

Ballou, Byron; Lagerhold, B. Christoffer; Ernst, Lauren A.; Bruzhez, Marcel P.; Waggoner, Alan S., Noninvasive Imaging of Quantum Dots in Mice, Molecular Biosensor and Imaging Center, and Department of Biological Sciences, Carnegie Mellon University, 4400 Fifth Avenue, Pittsburgh, Pennsylvania 15213 and Quantum Dot Corporation, 26118 Research Road, Hayward, California 94545, *Bioconjugate Chemistry* (Jan.-Feb. 2004), 15(1), 79-86.

Dubertret, Benoit; Skourides, Paris; Norris, David J.; Noireaux, Vincent; Brivanlou, Ali H.; Libchaber, Albert, In vivo imaging of quantum dots encapsulated in phospholipid micelles. *Center Studies in Physics and Biology, The Rockfeller Univ. New York, NY USA*. Science (Washington, DC, United States) (2002), 298 (5599), 1759-1762. CODEN: SCIEAS ISSN:0036-8075. Journal Written in English. CAN 138:333818 AN 2002:896503 CAPLUS (Copyright 2004 ACS on SciFinder (R)).

Akerman, Maria E.; Chan, Warren C.W.; Laakkonen, Pirjo; Bhatia, Sangeeta N.; Ruoslahti, Erkki. Nanocrystal Targeting In Vivo. *Cancer Research Center, The Burnham Institute, La Jolla, CA USA. Proceedings of the National Academy of Sciences of the United States of America* (2002), 99(20), 12617-12621. CODEN PNASA6 ISSN: 0027-8424. Journal Written in English. CAN 139:26451 AN 2002:795199 CAPLUS (Coipyright 2004 ACS on SciFinder (R)).

Westenhoff, Sebastian; Kotov, Nicholas A. Quantum Dot on a Rope. *Journal of the American Chemical Society* (2002), 124(11), 2448-2449. CODEN:JACSAT ISSN: 002-7863. Journal Written in English. CAN 136:326009 AN 2002:145011 CAPLUS (Copyright 2004 ACS on SciFinder (R)).

Costanzo, Philip J.; Patten, Timothy E.; Synthesis of Nanostructures comprised of biotinylated CdS/SiO2 Nanoparticles. *Department of Chemistry, University of California, Davis, Davis CA, USA. Abstracts of Papers, 226th ACS National Meeting, New York, NY United States*, Sep. 7-11, 2003 (2003), PSME-200. Publisher: American Chemical Society, Washington D.C. CODEN:69EKY9 Conference; Meeting Abstract written in English. AN 2003:636583 CAPLUS (Copyright 20904 ACS on SciFinder (R)).

Costanzo, Philip J.; Patten, Timothy E.; Smith, Rosemary. Synthesis of an α-siloxy-ω-amino poly(ethylene glycol) for use in ligating biological molecules to nanoparticles. *University of California at Davis, Davis, CA, USA. Polymer Preprints (American Chemical Society, Division of Polymer Chemistry*(2003), 44(1), 554-555. CODEN; ACPPAY ISSN: 0032-3934. Journal written in English. CAN 139:7333 AN 2003:210992 CAPLUS (Copyright 2004 (ACS on SciFinder (R)).

(Continued)

*Primary Examiner*—Michael J Feely
(74) *Attorney, Agent, or Firm*—Reinhart Boerner Van Deuren s.c.

(57) ABSTRACT

Nanoparticulate composites and dispersion thereof using novel polymeric ligand compounds, in certain embodiments in conjunction with pyridinyl moieties coupling the nanoparticulate and ligand.

23 Claims, 4 Drawing Sheets

OTHER PUBLICATIONS

Billancia, Gianmarco; Wouters, Daan; Precup, Andrei A.; Schubert, Ulright S. Towards Functionalized nanoparticles. Laboratory of Macromolecular and Organic Chemistry, Eindhoven Univ. of Tech., Eindhoven, Neth. *Polymeric Materials Science and Engineering* (2001), 85 508-509. CODEN: PMSEDG ISSN: 0743-0515. Journal Written in English. CAN 134:289177 AN 2001:585299 CAPLUS (Copyright 2004 ACS on SciFinder (R)).

Hong, Rui; Fischer, Nicholas O.; Verma, Ayush; Goodman, Catherine McIntosh; Emrick, Todd; Rotello, Vincent. Control of Protein structure and function through surface recognition by tailored Nanoparticle scaffolds. Department of Chemistry, University of Massachusetts Amherst, Amherst, MA, USA. *Abstracts of Papers, 226th ACS National Meeting, New York, NY, United States, Sep. 7-11, 2003* (2003). ORGN-575. *Publisher: American Chemical Society*, Washington D.C. CODEN:69EKY9 Conference; Meeting Abstract written in English. AN 2003:635661 CAPLUS (Copyright 2004 ACS on SciFinder (R)).

Skaff, Habib; Emrick, Todd. The use of 4-substituted pyridines to afford Amphiphilic, pegylated cadmium selenide nanoparticles. Department of Polymer Science and Engineering, University of Massachusetts, Amherst, MA, USA. *Chemical Communications* (Cambridge, United Kingdom) (2003), (1), 52-53. CODEN:CHCOFS ISSN: 1359-7345., Journal Written in English. CAN 138:344463 AN 2003:22276 CAPLUS (Copyright 2004 ACS on SciFinder (R)).

Bhadra D; Bhadra S; Jain P; Jain NK. Pegnology: a review of PEGylated systems. Department of Pharmaceutical Sciences, Dr. Harisingh Gour University, Sagar, India Pharmazie (Jan. 2002), 571(1), 5-29. Journal Code: 9800766. ISSN:0031-7144. Journal; Article; (Journal Article); General Review; (Review); (Review, Academic) written in English. DN 21825544 PubMed ID 11836932 AN 2002104824 Medline (Copyright 2004 U.S.National Library of Medicine on SciFinder (R)).

Qi, Limin; Coelfen, Helmut; Antonietti, Markus. Synthesis and Characterization of CdS Nanoparticles Stablized by Double-Hydrophilic Block Copolymers. Research Campus Golm, Max-Planch-Institute of Colloids & Interfaces Colloid Chemistry, Potsdam, Germany. Nano Letters (2001), 1(2), 61-65. CODEN:NALEFD ISSN: 1530-6984. Journal written in English. CAN 134:164036 AN 2000:866753 CAPLUS (Copyright 2004 ACS on SciFinder (R)).

Hirai, Takayuki; Saito, Tsuyoshi; Komasawa, Isao. Recovery and Immoblization of Metal Sulfide Nanoparticles from Reverse Micellar System onto Thiol-Modified Polystyrene Particles. Department of Chemical Science and Engineering Graduate School of Engineering Science, Osaka University, Toyonaka, Japan. *Journal of Physical Chemstry B* (2000), 104(49), 11639-11643. CODEN;JPCBFK ISSN: 1089-5647. Journal written in English. CAN 134:76894 AN 2000:805447 CAPLUS (Copyright 2004 ACS on SciFinder (R)).

Gref, Ruxandra; Couvreur, Patrick; Barratt, Gillian; Mysiakine, Evgueni. Surface-Engineered nanoparticles for multiple ligand coupling. UMR CNRS< School of Pharmacy, University of Paris Sud, Chatenay Lalabry, Fr. Biomaterials (2003), 24(24), 4529-4537. CODEN:BIMADU ISSN: 0142-9612. Journal written in English. AN 2003:612437 CAPLUS (Copyright 2004 ACS on SciFinder (R)).

Ouyang, Min; Awschalom, David D. Coherent Spin Transfer Between Molecularly Bridged Quantum Dots. Department of Physics and Center for Spintronics and Quantum Computing, University of California, Santa Barbara, CA, USA> Science (Washington DC, United States) (2003), 302(5636), 1074-1078.

Nakajima, Anri. Fabrication of Si and metal nanoscale dot structures and their application to single-electron devices. Research Center for Nanodevices and Systems, Hiroshima University, Hiroshima, Japan. Recent Research Developments in Applied Physics (1999), 2(Pt. 2), 637-716.

Lohmeijer, BGG; and Schubert, US; Water-Soluble Building Blocks for Terpyrdine-Containing Supramolecular Polymers: Synthesis, Complexation, and pH Stability Studies of Poly(ethylene oxide) Moieties(sup a); Macromol. Chem. Phys. 2003, 1072-1078, vol. 204, No. 8.

Gohy, JF; Lohmeijer, BGG; and Schubert, US; Metallo-Supramolecular Block Copolymer Micelles; Macromolecules, 2002, 4560-4563, vol. 35, No. 12.

* cited by examiner

PYRIDINE AND RELATED LIGAND COMPOUNDS, FUNCTIONALIZED NANOPARTICULATE COMPOSITES AND METHODS OF PREPARATION

This application claims priority benefit from provisional application Ser. No. 60/404,105 filed Aug. 16, 2002, the entirety of which is incorporated herein by reference.

BACKGROUND OF THE INVENTION

Colloidal nanoparticles, especially those with active electronic and luminescent properties, have attracted a great deal of interest as components in various devices, as well as in biotechnology for use as fluorescent tags. Semiconducting nanoparticles, or quantum dots (QD's), possess significant advantages over conventional organic fluorophores in that their luminescence emission profiles are very narrow (c.a. 20-30 nm fwhm), they show good resistance to photobleaching, and absorb continuously above the bandgap. These unique properties allow for the use of multiple tags of various emissions to be excited simultaneously by a single convenient energy source of appropriate wavelength for extended periods of time.

Solubilization of nanoparticles in a given solvent system is a prerequisite to many biological and environmental applications. For example, several strategies that afford water soluble cadmium selenide (CdSe) nanoparticles for biological applications have been described recently [3, 5]. (a) Gerion, D.; Pinaud, F.; Williams, S. C.; Parak, W. J.; Zanchet, D.; Weiss, S.; Alivisatos, A. P. *J. Phys. Chem. B.* 2001, 105, 8861; (b) Han, M.; Gao, X.; Su. J. Z.; Nie, S. *Nature Biotechnology* 2001, 19, 631; (c) Mattoussi, H.; Mauro, J. M.; Goldman, E. R.; Anderson, G. P.; Sundar, V. C.; Mikulec, F. V.; Bawendi, M. G. *J. Am. Chem. Soc.* 2000, 122, 12142-12150. (a) Pathak, S.; Choi, S.; Arnheim, N.; Thompson, M. E. *J. Am. Chem. Soc.* 2001, 123, 4103; (b) Bruchez, M.; Maronne, M.; Gin, P.; Weiss, S.; Alivisatos, A. P.; *Science* 1998, 281, 2013; (c) Rosenthal, S. J.; Tomlinson, I.; Adkins, E. M.; Schroeter, S.; Adams, S.; Swafford, L.; McBride, J.; Wang, Y.; DeFelice, L. J.; Blakely, R. D. *J. Am. Chem. Soc.* 2002, 124, 4586; (d) Qi, L.; Colfen, H.; Antonietti, M. *Nano Lett.* 2001, 1, 61. It was demonstrated that CdSe/ZnS core-shell nanoparticles can be made water-soluble by subsequent introduction of a silica encapsulating shell containing ionizable end-groups. This approach, while synthetically tedious, produces photostable water-soluble CdSe nanoparticles where end-group ionization, of phosphonates for example, plays a key role. Other techniques of the prior art have relied on organic encapsulants, usually hydrophilic thiols, to solubilize the CdSe nanoparticles in aqueous media. These techniques are generally more facile, but give nanoparticles with lower stability, and pH dependent water solubility. Aldana, J.; Wang, A.; Peng, X. *J. Am. Chem. Soc.* 2001, 123, 8844. In particular, unwanted disulfide formation ultimately leads to nanoparticle instability.

From the preceding, it is seen that new, simple methods for preparing soluble nanoparticles yielding well-dispersed materials that retain the photoluminescent and quantum yield properties of the nanoparticles are needed in this nanotechnology field. The development of such methods and systems, together with the resulting nanoparticulate composites, remain an on-going concern in the art.

SUMMARY OF THE INVENTION

In light of the foregoing, it is an object of the present invention to provide a wide range of particulate-ligand compositions designed for compatibility with a given solvent system and/or methods for their production, thereby overcoming various deficiencies and shortcomings of the prior art, including those discussed above. It will be understood by those skilled in the art that one or more aspects of this invention can meet certain objectives, while one or more other aspects can meet certain other objectives, each objective may not apply equally, in all its respects, to every aspect of this invention. As such, the following objects can be viewed in the alternative with respect to any one aspect of this invention.

It is an object of the present invention to provide a variety of nanoparticle-polymer composite materials, each such composite compositionally designed for compatibility with a given solvent system, such that when introduced thereto the nanoparticulate component thereof retains its inherent electronic and/or optical (e.g., absorbance and photoluminescence) properties.

It is a related object of the present invention to provide, more particularly, a CdSe nanoparticle-polymer composite dispersible in both aqueous and organic solvent systems.

It is another object of the present invention to provide a method of preparing a variety of substrate-polymer composite materials as can be designed by synthetic choice to meet a variety of solvent dispersibility requirements.

It is yet another object of the present invention to provide a novel class of ligand compositions, preferably including polyethylene glycol components over a range of molecular weights and terminated with pyridinyl moieties, as can be used in the preparation of dispersible or solubizable substrate/ particulate systems.

Other objects, features, benefits and advantages of the present invention will be apparent from the foregoing, in light of the summary and the examples and descriptions which follow, and will be readily apparent to those skilled in the art having knowledge of various nanoparticulate systems, their preparation and subsequent use. Such objects, features, benefits and advantages will be apparent from the above as taken in conjunction with the accompanying examples, tables, graphs, data and all reasonable inferences to be drawn therefrom.

In part, the present invention relates to a novel group of complexed metal/metallic composites, compositions and/or related materials including a particulate and/or substrate component, a polymeric ligand component and a nitrogenous coupling moiety. Substrates include, but are not limited to: cadmium selenide (CdSe), cadmium sulfide (CdS), cadmium telluride (CdTe), zinc sulfide (ZnS), cobalt (Co), and any other known particulate component as can be complexed, coordinated and/or chelated with a polymeric ligand of the type described herein. In various embodiments, as illustrated below and depending upon end use application, luminescent CdSe nanoparticles can be used. Alternatively, a substrate component can be provided with a shell, layer or coating thereon. For example, a cadmium-based nanoparticle, coated with a shell of ZnS or ZnSe can also be used as a composite substrate.

In part, the present invention also relates to a novel class of polymeric ligand compounds comprising a nitrogenous-terminated polymeric component as can be used to prepare the nanoparticle/substrate-polymer materials/composites described above. In such embodiments, the polymeric component(s) of each such ligand can include, but is not limited to, poly(ethylene glycol) (PEG) with a molecular weight as can vary depending upon end use application. Typically, but without limitation, the molecular weight of each such component can range from about 200 to about 5000 or greater. In certain embodiments, where the repeating glycol unit can be represented by $(OCH_2CH_2)_n$, n can range from about 2 to about 100 or greater. Regardless, such a PEG component can, opposite the pyridine terminus be substituted with a functional chain-end moiety such as, but not limited to hydroxy, alkyl, alkoxy (ether), carboxylate, thymine, and ammonium or substituted ammonium salts. Various other end/functional groups will be well known to those skilled in the art and made aware of this invention, incorporation of which can be achieved through available synthetic methods either before or after coupling with a suitable pyridinyl or other nitrogenous moiety.

Various other ligand components can be employed depending upon end use application or compatibility with an associated or predetermined solvent system. Associated polymeric components, without regard as to chain length or molecular weight, include but are not limited to: poly(hexaethylene glycol), poly(hexadecylethylene glycol), poly($\epsilon$-caprolactone), poly(lactide), poly(glycolide), polyglycidyl, and polypropylene oxide, alone or in combination with one another and/or a PEG component. Accordingly, the present invention includes design, choice or variation of the polymeric component of such a ligand compound depending on a given solvent system in which the nanoparticle or other substrate is to be dispersed. For example, a more hydrophilic polymeric or co-polymeric component could be used in applications involving aqueous systems whereas monomers or polymeric blocks could be included for hydrophobic applications involving organic or mixed solvent systems. Likewise, system solubility can be further modified, as provided below with ligands comprising multiple polymeric components and/or related substituents. Alternatively, and from a more functional perspective, a polymeric ligand can comprise one or more electronically active polymers.

Without limitation, the terminal nitrogenous moiety of such ligand compounds can comprise an amino, pyridinyl or aminopyridinyl moieties and can be coupled to a polymeric component by, for instance, an ether or amine bond linkage. For example, as illustrated more fully below, a preferred pyridine moiety can be coupled to a suitable polymeric component at the 4-position via an ether linkage using 4-hyroxypyridine. Alternatively, an amino linkage can be used, as available through a suitable corresponding pyridine or amine-substituted polymeric precursor.

With respect to either the compounds, composites and/or methods of this invention, the nitrogenous moieties and/or polymeric components can comprise, consist of or consist essentially of any of the aforementioned molecular entities and/or functional groups thereof. Each such moiety or component thereof is distinguishable, characteristically contrasted, and can be practiced in conjunction with the present invention separate and apart from another. Accordingly, it should be understood that the inventive composites, compounds and/or methods, as illustratively disclosed herein, can be practiced or utilized in the absence of any one moiety or component which may or may not be disclosed, referenced or inferred herein, the absence of which may not be specifically disclosed, referenced or inferred herein.

As discussed above, the ligands of this invention can be used in conjunction with a substrate or particulate component to provide, depending on end use application, the non-aggregation or dispersibility desired for a given solvent system. In such composites or compositions, a para-substituted pyridinyl moiety can serve as the coupling agent between the substrate and the polymeric component. However, consistent with the broader aspects of this invention, a number of other pyridinyl or nitrogenous moieties can be used. For example, using N,N-dimethylaminopyridine (DMAP) replacement of the methyl groups with any of the polymeric components described herein can also provide a useful coupling component and ligand composition. Alternatively, an amino-terminated PEG component, either of the monoamine or $\alpha,\omega$-diamine form, can be used for the functionalization and water-solubilization of the substrates or nanoparticles named herein, as an extension of the pyridinyl chemistry described.

As illustrated below, in conjunction with several preferred embodiments, the ligand compounds of this invention can be prepared in a straight-forward manner. Specifically and as it relates to certain embodiments, such method includes selecting a polymeric component providing the desired solution properties for reaction with a para-substituted pyridinyl (coupling) component, at room temperature in tetrahydrofuran or a suitable solvent, using diisopropyl azodicarboxylate (DIAD). In such a fashion, PEG-diols or PEG-monomethyl ethers can be coupled to 4-hydroxypyridine to give the corresponding pyridine-terminated PEG ligand compounds.

In part, the present invention is also directed to provide a facile, efficient method and/or system for preparation and dispersion of a nanoparticulate substrate-polymer composite material. Such method includes (1) providing a particulate complexed to a first ligand, such a complex or composite as can be in a first liquid medium; and (2) displacing or exchanging the first ligand with a second ligand—as can be in or at least partially soluble in a second liquid medium, providing the particulate complexed with the second ligand a degree of solubility or dispersibility in the second medium. As discussed above, the particulate is preferably nano-dimensioned and of a material composition suitable for a given end-use application. For example, the first ligand, initially complexed to the particulate, can be tri-n-octylphosphine oxide, displacement or exchange of which with a second ligand can provide the desired solubility or dispersibility. Generally, the second ligand can be one having greater affinity for a given particulate material—whether in terms of chelation, coordination and/or complexing capability. In preferred embodiments of this invention, the second ligand comprises pyrdinear a pyridinyl moiety coupled to a polymeric component of the sort described above.

As described in detail elsewhere herein, displacement, exchange and/or attachment can be achieved directly or by: (1) stirring or combining a solution of conventional tri-n-octylphosphine oxide (TOPO)-covered nanoparticles in/with pyridine to displace the TOPO ligands; and (2) introducing a solution of pyridine-covered nanoparticles obtained in (1) to a solution of pyridinyl-PEG ligands, whereby the pyridinyl-PEG ligands displace the pyridine ligands. While the present invention is illustrated in the context of an initial TOPO-complexed nanoparticle, it will be understood that the TOPO ligand is merely a manifestation of the isolation and subsequent use of a preferred nanoparticulate substrate. It will be further understood by those skilled in the art that with regard to the methodologies of this invention a variety of other ligands can be associated initially with a given substrate material, then displaced or exchanged with one of the present ligand compounds. Such exchange or displacement is limited only by the labile nature of the initial ligand in the context of a given substrate material, the choice of a second ligand for displacement therewith and the relative affinity of the second ligand for a particular substrate.

PEG and related polymeric encapsulation of nanoparticles offers a ligand environment with the potential to satisfy multiple requirements, including water solubility and biocompatibility. PEG is widely recognized for its biocompatible nature, as it is generally resistant to indiscriminate protein adsorption, a valuable property to consider when introducing foreign matter into a biological environment. In addition, the amphiphilic character of PEG makes it a very versatile material for dispersing nanoparticles in a wide variety of environments. However, PEG itself (e.g., HO—$(CH_2CH_2O)_n$—OH) does not solubilize, for instance, CdSe nanoparticles, as the hydroxy chain-ends do not strongly coordinate to the CdSe surface. The present invention provides, then, in one PEG-related embodiment, a rapid route to amphiphilic CdSe nanoparticles, using a class of ligands comprising a nitrogenous moiety coupled to a PEG component to provide the amphiphilic environment. This new ligand architecture provides a means to rapidly obtain both water and organically soluble CdSe or various other nanoparticles, where neither ionization nor the use of thiols are required to give water solubility.

As provided herein, and illustrating various broader aspects of this invention, rapid preparation of CdSe nanoparticles with pyridine terminated poly(ethylene glycol) exhibits good solubility in both organic and aqueous media. In each environment, the inherent optical properties of the original nanoparticles are maintained. Such ligands described here are the first reported case where a para-substituted pyridine moiety is used for stabilization of CdSe nanoparticles, and the first time a corresponding composite has been prepared using a pyridinyl-terminated ligand comprising long chain poly (ethylene glycol). The simplicity and effectiveness of this invention will further stimulate the integration of nanoparticle science, potentially advancing and diversifying the use of nanoparticles for biological screening and detection.

EXAMPLES OF THE INVENTION

The following non-limiting examples and data illustrate various aspects and features relating to the composites, compounds, systems and/or methods of the present invention, including the synthesis of PEG-pyridinyl ligand compounds and use thereof in the synthesis of CdSe nanoparticle composites which are soluble in both water and organic solvents, such compounds and composites as are available through these synthetic methodologies described herein. In comparison with the prior art, the present compounds, composites and/or methods provide results and data which are surprising, unexpected and contrary thereto. While the utility of this invention is illustrated through the use of several composites/compositions and structural moieties presented therewith, it will be understood by those skilled in the art that comparable results are obtainable with various other composites/compositions, as are commensurate with the scope of this invention.

General Methods

Selenium (99.999%), tri-n-octylphosphine (tech., 90%), and 4-hydroxypyridine (tech., 90%) were purchased from Alfa Aesar. Diisopropyl azodicarboxylate (98%), triphenylphosphine (99%), and hexaethylene glycol were purchased from Aldrich. Hexadecylethylene glycol monomethylether was purchased from Polysciences, Inc. and purified by column chromatography to remove diol contaminant. Tetrahydrofuran was purified by conventional distillation over sodium/benzophenone. $^1H$ and $^{13}C$ NMR spectra were recorded on a Bruker-Spectrospin 300. UV/Visible spectra were recorded on a Hitachi U-3010, and photoluminescence measurements were taken on a Perkin-Elmer LS50B (excitation 330 nm). Transmission electron microscopy (TEM) was performed on a JEOL JEM-2000FX microscope operating at 100 KeV and 60 K magnification. TEM grids were purchased from Ted Pella, Inc., and consisted of 3-4 nm amorphous carbon film supported on a 400-mesh copper grid.

Example 1a

Figure 1:
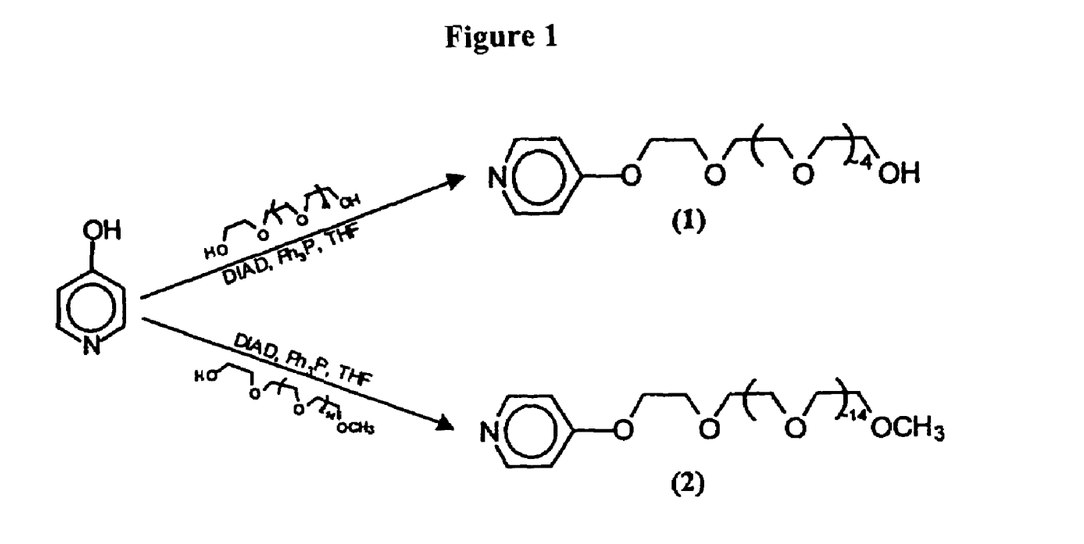
FIG. 1. Schematic representation illustrating the coupling reaction of 4-hydroxypyridine with a poly (ethylene glycol) (PEG) compound/component resulting in the synthesis of ligands 1 and 2, in accordance with this invention: (1) Ligand 1—prepared with hexaethylene glycol, n=4; (2) Ligand 2—prepared with hexadecylethylene glycol monomethylether, n=14.

Ligands 1 and 2 were synthesized by Mitsunobu coupling of 4-hydroxypyridine with hexaethylene glycol and hexadecylethylene glycol monomethylether, respectively. (See examples 1b and 1c, below.) These reactions were performed at room temperature in tetrahydrofuran, using diisopropyl azodicarboxylate (DIAD) as the coupling agent (FIG. 1). Note that 1 and 2 are not single molecules, but instead low polydispersity materials, as dictated by the inherent polydispersity of the PEG starting materials. In the case of mono-substituted hexaethylene glycol 1, a large excess of the PEG diol was used in the Mitsunobu coupling, in order to minimize the amount of α,ω-dipyridinyl material formed; when kept to a minimum, this disubstituted material was easily removed from the desired product by column chromatography on silica gel. Reactions to prepare both 1 and 2 were performed on the multigram scale; typical isolated yields of pure material were in the range of 50-80%. $^1H$ NMR spectroscopy of ligands 1 and 2 showed triplets at δ 4.1 and δ 3.8 ppm, assigned to the two PEG methylene groups nearest the aromatic ring; these are shifted downfield from the same methylene groups of the starting unsubstituted PEG. The $^{13}C$ NMR spectrum of 1 showed a resonance at δ 61.4 ppm for the $\underline{CH_2}$OH chain-end; this resonance is, as expected, absent in the carbon spectrum of monomethyl ether 2. High resolution mass-spectroscopy of 1 and 2 shows multiple peaks, indicative of the polydispersity of the samples, with major peaks at 360.2022 and 768.4385 a.m.u. respectively. Ligand 1 has the added advantage of containing a free hydroxyl group that should be amenable to addition of organic and bioactive moieties.

Example 1b

Preparation of pyridine terminated 4-hexaethylene glycol (Ligand 1). 4-Hydroxypyridine (4.0 g, 42 mmol), triphenylphosphine (13.1 g, 50 mmol), and diisopropyl azodicarboxylate (10.1 g, 50 mmol) in THF (500 mL) were stirred at room temperature under nitrogen for 30 min. Hexaethylene glycol (51.6 g, 105 mmol) was added, and the mixture was stirred for 12 hours. THF was removed under vacuum, and the residue was purified by column chromatography eluting with chloroform: acetone: methanol mixtures to yield 1 (8.4 g, 56%): $^1H$ NMR (300 MHz, CDCl$_3$) δ 8.36 (d, aromatic), δ 6.78 (d, aromatic), 4.12 (t, pyr-O—$CH_2$—$CH_2$), 3.82 (t, pyr-O—$CH_2$—$CH_2$), 3.59 (br, $CH_2$) ppm; $^{13}C$ NMR (75 MHz, CDCl$_3$) δ 164.7, 150.8, 110.2, 72.4, 70.7, 70.44, 70.38, 70.36, 70.2, 69.1, 67.1, 61.4 ppm; HRMS, calcd. 359.1942; Found M+H 360.2022.

Example 1c

Preparation of pyridine terminated 4-hexadecylethylene glycol monomethylether (Ligand 2). 4-hydroxypyridine (2.0 g, 22 mmol), triphenylphosphine (6.3 g, 24 mmol), and diisopropyl azodicarboxylate (4.8 g, 24 mmol) in THF (250 mL) were stirred at room temperature under nitrogen for 30 min.; hexadecylethylene glycol monomethylether (14.3 g, 20 mmol) was added, and the mixture was stirred overnight. THF was removed under vacuum, and the residue was purified by column chromatography eluting with chloroform:acetone:methanol mixtures to yield 2 (12.0 g, 78%). $^1$H NMR (300 MHz, CDCl$_3$) δ 8.42 (d, aromatic), 6.82 (d, aromatic), 4.15 (t, pyr-O—CH$_2$—CH$_2$), 3.86 (t, pyr-O—CH$_2$—CH$_2$), 3.66 (br, CH$_2$, 3.37 (s, CH$_3$) ppm; $^{13}$C NMR (75 MHz, CDCl$_3$) δ 164.7, 150.9, 110.2, 72.6, 71.8, 70.8, 70.4, 70.1, 67.1, 69.2, 58.9 ppm; HRMS calcd. 769.4441; Found M–H 768.4385.

Example 2

Compounds 1 and 2 are thermally stable to temperatures above 270° C., as determined by thermogravimetric analysis. Despite this excellent thermal stability, CdSe nanoparticles could not be synthesized in conjunction with these materials, presumably due to an inability of these compounds 1 and 2 to form a complex with the cadmium source (CdO) used in the synthesis. Therefore, tri-n-octyl phosphine oxide (TOPO)-covered nanoparticles were prepared by literature procedures [8]. (a) Peng, Z. A.; Peng, X. G. *J Am. Chem. Soc.* 2001, 123, 183-184; (b) Qu, L.; Peng, A.; Peng, X. G; *Nano. Lett.* 2001, 6, 338. The ligand exchange chemistry of this invention, as illustrated by several of the following examples, can then be used to attach representative PEG-pyridinyl ligands to the nanoparticle surface.

Example 3a

Figure 2:
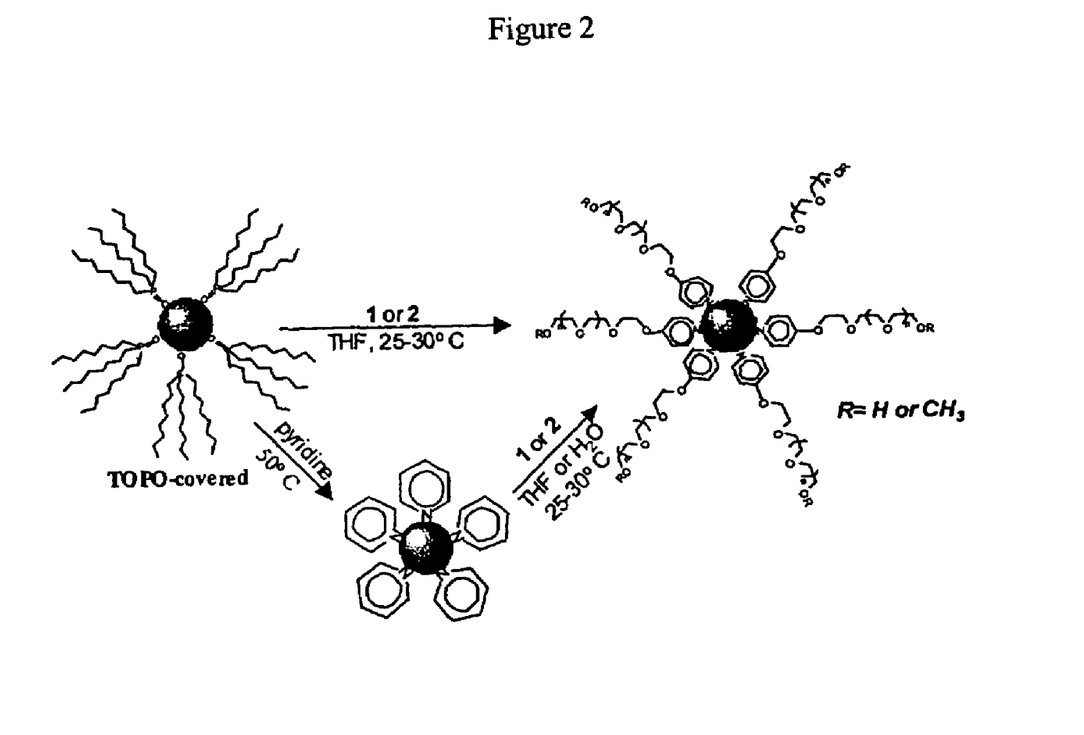
FIG. 2. Schematic representation illustrating the synthesis of PEGlyated CdSe nanoparticles coupled with Ligands 1 or 2, in accordance with this invention.
Figure 4:
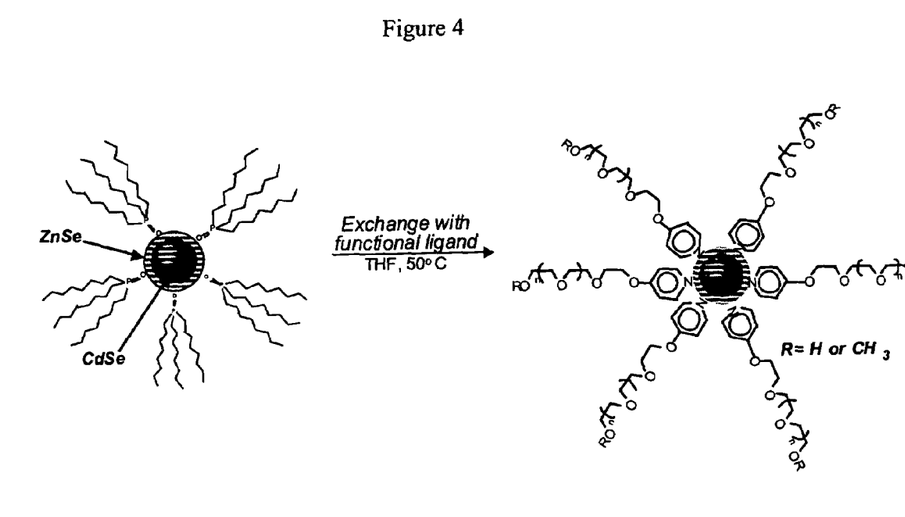
FIG. 4. Schematic representation illustrating synthesis of PEGylated core-shell nanoparticles, in accordance with this invention.

Pegylated pyridines 1 and 2, containing p-ether substituents can be utilized in a number of ligand exchange scenarios. For example, TOPO can be displaced from the nanoparticle surface by conventional pyridine stripping, followed by adsorption of 1 and 2 to the nanoparticle surface from THF solutions (FIG. 2). Alternatively, the exchange process can be performed directly in water by addition of aqueous solutions of 1 or 2 to a suspension of pyridine-covered CdSe, whereupon the suspension became homogenous instantly. (Reference is made to the detailed synthetic scheme of example 3b illustrating one embodiment of the present methodology.) Even more conveniently, ligand exchange was accomplished successfully by simply adding 1 or 2 to a solution of TOPO-covered nanoparticles in THF, and allowing the mixture to stand at room temperature overnight (FIG. 4). In the aromatic portion of the $^1$H NMR spectra (recorded in CDCl$_3$) of these new pegylated nanoparticles, the pyridine resonances are slightly broadened and shifted upfield from those of the free ligand.

Example 3b

General procedure to afford pegylated CdSe nanoparticles covered with Ligand 1 or 2. TOPO-covered nanoparticles were prepared as described in the literature by Peng and co-workers, then precipitated into anhydrous methanol and centrifuged twice. The supernatant was discarded and the nanoparticles were dispersed in pyridine and allowed to stand overnight. The nanoparticles were precipitated in hexanes and centrifuged. To this precipitate was added a solution of 1 or 2 (c.a. 200 mg) in either 2 mL of THF or MilliQ water. The solution became optically clear immediately. Alternatively, to a solution of TOPO-covered CdSe nanoparticles (c.a. 10 mg) in 3 mL of THF was added 200 mg of 1 or 2. The solution was allowed to stand at room temperature overnight, after which the CdSe nanoparticles were precipitated in hexanes and centrifuged. The supernate was discarded and the precipitate was redissolved in MillQ water, and centrifuged to remove any insoluble material. The supernate was removed and stored, giving an optically clear solution of CdSe nanoparticles in water.

Example 4

Figure 3:
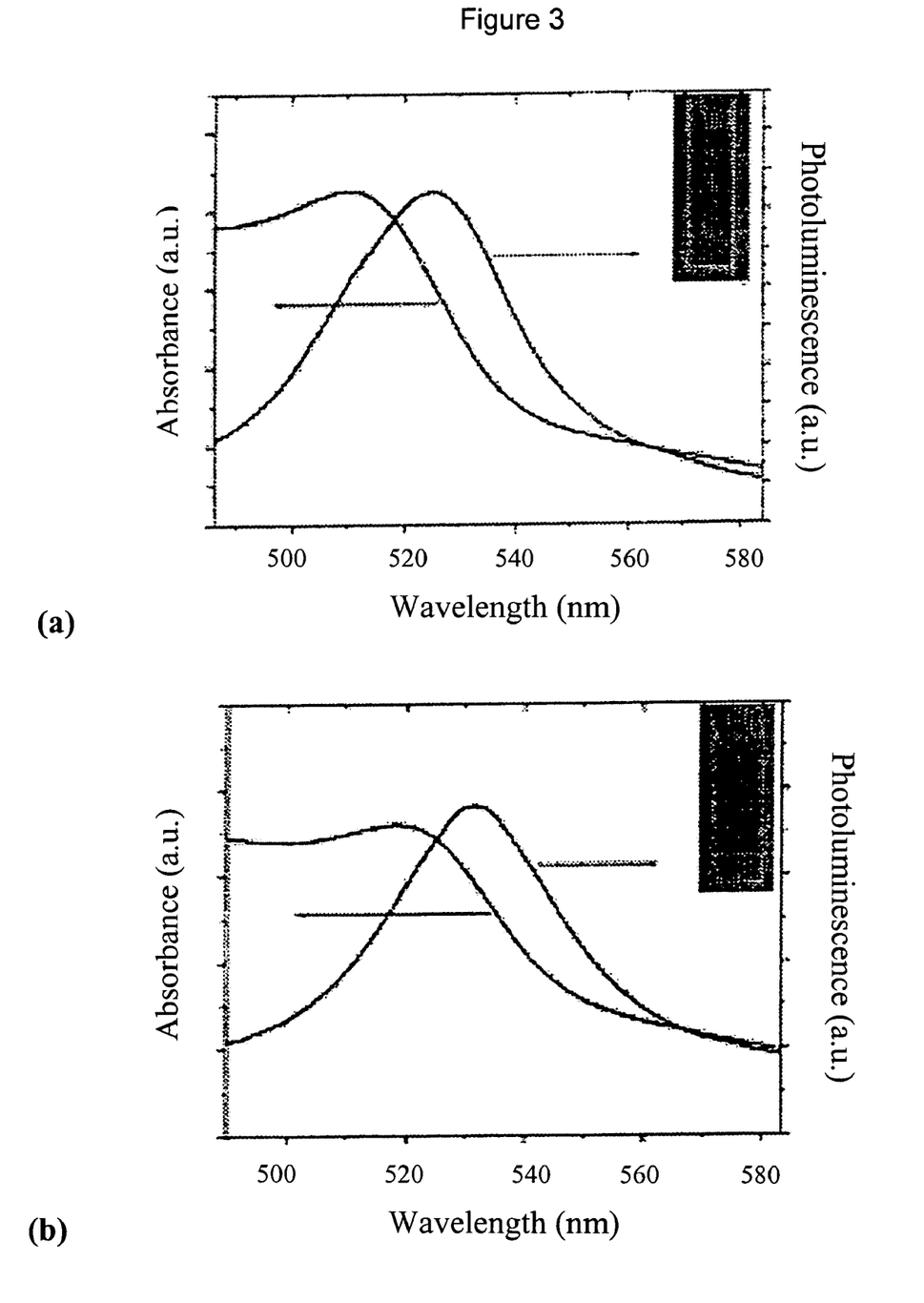
FIG. 3. Absorption and emission profiles of approximately 3 nm CdSe nanoparticles complexed with Ligand 1 in (A) organic solution and (B) aqueous solution.

Dissolution of 1- and 2-covered CdSe nanoparticles in either organic or aqueous media affords optically clear solutions. Typical materials prepared in this fashion showed similar absorption and emission profiles in both organic and aqueous solutions; FIG. 3 shows an example of approximately 3 nm CdSe nanoparticles covered with 1, where the first exciton absorption peak is found at ca. 520 nm, and emission maximum at ca. 530 nm, demonstrating that the optical properties of the same sample are maintained in each environment. These pegylated nanoparticles are exceptionally stable when stored in organic solvents, under ambient conditions (i.e., exposed to air and light), and have shown no signs of precipitation to date. In aqueous media and storage in the dark under nitrogen, these materials have shown similar stability to date. In aqueous media and ambient conditions, the nanoparticles remain soluble for about 2 weeks, after which precipitation is observed.

Example 5

Transmission electron microscopy (TEM) images of the pegylated nanoparticles of example 3b show excellent dispersion, with no indication of inter-particle aggregation. Samples cast from organic solvents showed a continuous distribution of particles over the entire TEM grid area. Alternatively, samples cast from water did not show a continuous distribution of particles, but instead showed distinct "islands" of nanoparticles on the grid. These individual islands were found contain non-aggregated nanoparticles; this island formation was attributed to dewetting of the water droplets on the hydrophobic carbon coating of the TEM-grids, which results in the deposition of small droplets of nanoparticle solution, rather than the continuous film observed when casting from organic solvents. The very fact that the nanoparticles are observed as discrete entities when casting from water is important, as this confirms that the pyridinyl-PEG chains favor binding to the nanoparticle surface in the aqueous environment. Furthermore, nanoparticle aggregates smaller than the wavelength of light may still give optically clear solutions.

Example 6a

To illustrate another embodiment of this invention, upon addition of N,N-dimethyaminopyridine (DMAP) to TOPO-covered CdSe nanoparticles, a complete displacement of TOPO by DMAP (as judged by $^1$H and $^{31}$P NMR) is observed. The exchange is more rapid than that observed when pyridine is used in a similar manner. The strength of the DMAP surface attachment may be based on its enhanced basicity relative to pyridine, presumably due to the electron donating effect of the para-dialkylamine substituent. This concept is applicable to a number of pyridine derivatives containing electron-donating substituents in the para position that similarly enhance basicity. Pegylated pyridines 1 and 2, containing p-ether substituents were shown above to function effectively in a number of ligand exchange scenarios. See, example 6b, below.

The results of this example support extension of the composites, ligand compounds and related methods of this invention to an amino linkage to the pyridinyl moiety and/or use of an alkyl or hydrocarbon component in lieu of the aforementioned polymeric components. While this example shows use of a trivalent amino linkage and multiple such polymeric or hydrocarbon components, several types of pyridines can also be employed. For instance, upon choice of an appropriate polyfunctional polymeric component, straightforward modification of the synthetic techniques described can be used to provide the corresponding polypyridinyl ligands.

Example 6b

Substituted diamino pyrdines

The diethanol-amino pyridine of this example was prepared according to the literature (*J. Chem. Soc.* 1955, 2021, 2025), and used to functionalize CdSe nanoparticles. The terminal hydroxy groups can be further functionalized: including but not limited to incorporation of PEG and poly (ε-caprolactone), as well as a range of esters, ethers, carbonates, and olefins, according to well-known synthetic procedures. As illustrated above, n=2 for diethanolamine, but more broadly n can range from about 2 to about 18 through choice of the corresponding dialkanolamine.

Example 7

4-PEG pyridine on core-shell nanoparticles. With reference to FIG. 4, a representative procedure for functionalization of core-shell quantum dots with a coating of PEGylated pyridine is as follows: 100 mg of TOPO-covered CdSe—ZnSe, (prepared by a literature method, e.g., Reiss, P.; Bleuse, J.; Pron, A. *Nano. Lett.* 2002, 2, 781) core-shell nanoparticles were stirred in a tetrahydrofuran (THF) solution of 4-PEG-pyridine (200 mg, 0.2 mmol) (PEG molecular weight=750 g/mol). The solution was stirred under an atmosphere of nitrogen at 50° C. for 8 hrs. The nanoparticles were precipitated into either hexanes or ether, then isolated by centrifugation and decanting the supernate. The precipitated nanoparticles could then be redissolved in water, or a number of organic solvents (i.e. THF, $CH_2Cl_2$, DMF, toluene, etc.). Alternatively, the nanoparticles were separated from excess ligand employing a centrifuge device. This was done by evaporating THF, then redissolving the core-shell CdSe—ZnSe PEGylated nanoparticles in ethanol, and centrifuging in the presence of the device (MWC=50,000). This process was repeated twice and the nanoparticles were finally dissolved in the desired solvent and stored in under $N_2$.

The procedure of this example can be extended to various other core-shell nanoparticles and polymeric ligand components. For example, nitrogenous moieties other than pyridine can be used in conjunction with a range of PEG components (e.g., from less than about 200-about 5,000 g/mol). The results of this example demonstrate this invention can be used in conjunction with core-shell nanoparticles, a point of significant interest as higher quantum yields are typically observed for such materials as compared to quantum dots coated only with organic ligands of the prior art.

Example 8

3-PEG pyridine. The different position of an electron donating ether chain may affect the nature of binding to a nanoparticle surface.

3-PEGylated pyridines

3-Hydroxypyridine (1 equiv), triphenylphosphine (1 equiv), and diisopropyl azodicarboxylate (1 equiv) in THF were stirred at room temperature under nitrogen for 30 min. Poly(ethylene glycol) monomethyl ether (0.80 equiv) of MW 550 was added, and the mixture was stirred for 12 hours. THF was removed under vacuum, and the residue was purified by column chromatography eluting with chloroform:methanol mixtures. Alternatively and as demonstrated elsewhere herein, PEG-diols can be used to give 3-PEGpyridines with OH terminal groups.

To illustrate ligand exchange and preparation of another composite of this invention, 15 mg of TOPO-covered CdSe nanoparticles were suspended in a solution of 250 mg of 3-PEG pyridine (MW=550 g/mol). The solution was stirred under nitrogen atmosphere at 50° C. for 8 hrs. The nanoparticles were precipitated in hexanes and centrifuged. The supernate was discarded and the precipitated nanoparticles could be redissolved in water or a variety of organic solvents (i.e. THF, $CH_2Cl_2$, DMF, toluene, etc.).

Example 9

Phenylhalide-substituted pyridines

Phenylhalide terminated pyridines and related polymeric ligand components. Ligands with available functionality can be used for subsequent chemistry on a nanoparticle composite or in conjunction with a related system of this invention: including the growth of electronically active polymers (i.e., polythiophene, polyacetylene, poly-para-phenylene, and polyphenylenevinylene) from the nanoparticle. One such approach is a ligand that binds to the nanoparticle surface and further provides a terminal phenylhalide functionality. Phenylhalides can be used as precursors to electronically-active polymers by organometallic-based polymerization methods known in the art to give electronically active polymers. This example demonstrates that the pyridine-phenylhalide component or moiety shown above effectively solubilizes CdSe nanoparticles by ligand exchange with TOPO-covered nanoparticles. Polymerization of phenylacetylene from the nanoparticle surface by known palladium-mediated coupling methods can, for instance, be used to provide the corresponding electronically active ligand and nanoparticle composite, with a pyridnylphenyl coupling moiety of the sort shown above.

More specifically, 4-hydroxypyridine (1 equiv), triphenylphosphine (1 equiv), and diisopropyl azodicarboxylate (1 equiv) in THF were stirred at room temperature under nitrogen for 30 minutes. 4-Bromobenzyl alcohol (0.8 equiv) was added, and the mixture was stirred for 12 hours. THF was removed under vacuum, and the residue was purified by column chromatography eluting with chloroform: methanol mixtures to give the pure product.

Example 10

4-allylether pyridine and hydrosilation. Allylether terminated pyridine, as shown above, has been prepared and used to functionalize CdSe and other nanoparticles, as described herein. In accordance with this invention, the olefin moiety can be coupled with silanes ($R_3Si$—H) using hydrosilation chemistry; (e.g., a functionalized PEG silanes (i.e., X—PEG—$Si(R_2)$—H, where X=any of a variety of available functional groups). Such ligands can provide a diverse range of novel nanoparticle composites, given the effectiveness of hydrosilation chemistry on a variety of molecular systems, such ligands limited only by tolerance of hydrosilation chemistry, the availability of a given 'X' substituent at the PEG terminal and, likewise, the tolerance of X to subsequent chemistry.

More specifically, 4-hydroxypyridine (1.0 equiv.) was stirred in an excess of allyl bromide under a nitrogen atmosphere. Sodium hydride (1.1 equiv.) was added as a suspension in THF, and the solution was heated to reflux for 4 hours. The mixture was allowed to cool to room temperature, then was poured into water and extracted with ether. The ether solution was dried over magnesium sulfate, and the product was purified by distillation.

While the principles of this invention have been described in connection with specific embodiments, it should be understood clearly that these descriptions are added only by way of example and are not intended to limit, in any way, the scope of this invention. For instance, the composites of this invention can include ligand compounds comprising any of the aforementioned polymeric components and a non-pyridinyl coupling moiety, such ligand compounds as can be prepared as described herein or as would be known to those skilled in the art made aware of this invention using known synthetic techniques or straight-forward modifications thereof, Other advantages, features and benefits will become apparent from the claims hereinafter, with the scope thereof determined by the reasonable equivalents, as would be understood by those skilled in the art.

We claim:

1. A complexed nanoparticle composite comprising a metallic nanoparticulate substrate component, a polymeric ligand component, and a monodentate nitrogenous coupling moiety, said monodentate nitrogenous coupling moiety selected from a pyridinyl moiety and an aminopyridinyl moiety, said monodentate nitrogenous coupling moiety coupling a terminus of said polymeric ligand component and said metallic nanoparticulate substrate component; wherein a nitrogen atom of said monodentate nitrogenous coupling moiety is directly bonded to said metallic nanoparticulate substrate component.

2. The composite of claim 1 wherein said metallic nanoparticulate substrate component comprises a nanoparticle selected from CdSe, CdS, CdTe, ZnS, ZnSe, Co and combinations thereof.

3. The composite of claim 1 wherein said polymeric ligand component comprises a component selected from poly(ethylene glycol), poly(hexaethylene glycol), poly(hexadecylethylene glycol), poly(e-caprolactone), poly(lactide), poly(glycolide), polyglycidyl, polypropylene oxide and combinations thereof.

4. The composite of claim 3 wherein said polymeric ligand component comprises a poly(ethylene glycol) component, said polymeric ligand component having an uncoupled terminus comprising a functional group moiety selected from hydroxy, alkyl, alkoxy, carboxylate, thymine, ammonium salt and substituted ammonium salt moieties.

5. An emissive complexed nanoparticle composite comprising a CdSe nanoparticle, a polymeric ligand component, and a nitrogenous coupling moiety, said nitrogenous coupling moiety selected from a single pyridinyl moiety and a single aminopyridinyl moiety, said polymeric ligand component comprising ethylene glycol monomers, said nitrogenous coupling moiety coupling a terminus of said polymeric ligand component and said CdSe nanoparticle; wherein a nitrogen atom of said nitrogenous coupling moiety is directly bonded to said CdSe nanoparticle.

6. The composite of claim 5 wherein said polymeric ligand component comprises a poly(ethylene glycol) component having a molecular weight of about 200 to about 5,000.

7. The composite of claim 5 wherein said polymeric ligand component comprises about 2 to about 20 ethylene glycol monomers.

8. The composite of claim 5 wherein said polymeric ligand component has an uncoupled terminus comprising a functional group moiety selected from hydroxy, alkyl, alkoxy, carboxylate, thymine, ammonium salt and substituted ammonium salt moieties.

9. The composite of claim 5 wherein said CdSe nanoparticle further comprises a layer thereon selected from ZnS and ZnSe.

10. A polymeric compound comprising: a polymeric ligand component, a terminal pyridinyl moiety, and a terminal functional group moiety, said polymeric ligand component comprising a poly(ethylene glycol) component having at least 2 ethylene glycol monomers and a co-polymeric component selected from poly(hexaethylene glycol), poly(hexadecylethylene glycol), poly(e-caprolactone), poly(lactide), poly(glycolide), polyglycidyl, polypropylene oxide and combinations thereof said terminal pyridinyl moiety boned to said polymeric ligand component via an ether bond linkage or an amine bond linkage, and said terminal functional group moiety selected from hydroxy, alkyl, alkoxy, carboxylate, thymine, ammonium salt and substituted ammonium salt moieties.

11. The polymeric compound of claim 10 comprising up to about 100 ethylene glycol monomers.

12. A system for nanoparticulate dispersion, said system comprising:
   a composite comprising a nanoparticulate substrate complexed with a first ligand component, said composite in a first liquid medium; and
   a second ligand component in a second liquid medium, said second ligand component at least partially soluble in said second liquid medium and comprising a component selected from poly(ethylene glycol), poly(hexaethylene glycol), poly(hexadecylethylene glycol), poly(e-caprolactone), poly(lactide), poly(glycolide), polyglycidyl, polypropylene oxide and combinations thereof, said second ligand component comprising a terminal nitrogenous coupling moiety.

13. The system of claim 12 wherein said second ligand component has an affinity for said nanoparticulate substrate greater than said first ligand component.

14. The system of claim 13 wherein said second ligand component comprises a terminal pyridinyl coupling moiety.

15. The system of claim 14 wherein said second ligand component comprises a poly(ethylene glycol) component and said second liquid medium is aqueous.

16. The system of claim 12 wherein said nanoparticulate substrate comprises a CdSe nanoparticle and said second ligand component has a greater affinity for said substrate than said first ligand component.

17. The system of claim 16 wherein said second ligand component comprises a poly(ethylene glycol) component and a terminal pyridinyl coupling moiety.

18. A method of using ligand solubility to disperse a nanoparticulate substrate, said method comprising:
   providing a composite comprising a nanoparticulate substrate complexed with a first ligand component; and
   contacting said composite with a second ligand component, said second ligand component in a liquid medium, said second ligand component having a terminal nitrogenous coupling moiety and is at least partially soluble in said medium, said contact with said second ligand component displacing said first ligand component and dispersing said nanoparticulate substrate in said medium.

19. The method of claim 18 wherein said nanoparticulate substrate comprises a nanoparticle selected from CdSe, CdS, CdTe, ZnS, ZnSe, Co and combinations thereof.

20. The method of claim 18 wherein said second ligand component comprises a component selected from poly(ethylene glycol), poly(hexaethylene glycol), poly(hexadecylethylene glycol), poly(e-caprolactone), poly(lactide), poly(glycolide), polyglycidyl, polypropylene oxide and combinations thereof.

21. The method of claim 20 wherein said second ligand component comprises a poly(ethylene glycol) component.

22. The method of claim 20 wherein said terminal nitrogenous coupling moiety is a terminal pyridinyl coupling moiety.

23. The method of claim 22 wherein said liquid medium is aqueous and contact with said second ligand component disperses said nanoparticulate substrate therein.

* * * * *